United States Patent [19]

Reinke et al.

[11] Patent Number: 4,797,246
[45] Date of Patent: Jan. 10, 1989

[54] CONTINUOUS MANUFACTURE OF A PERFORATED PLASTIC FILM

[76] Inventors: Dietmar Reinke, Ringstrasse 50, 8551 Kirchehrenbach; Theo Schmidt, Kiefernstrasse 7, 8550 Forchheim, both of Fed. Rep. of Germany

[21] Appl. No.: 573,717

[22] Filed: Jan. 25, 1984

[30] Foreign Application Priority Data

Feb. 4, 1983 [DE] Fed. Rep. of Germany ....... 3303836

[51] Int. Cl.⁴ .................. B29C 47/78; B29C 59/00
[52] U.S. Cl. ................... 264/504; 264/101; 264/154; 264/210.1; 264/210.2; 264/237; 264/284; 264/348; 264/556; 264/557; 264/562; 264/571; 264/DIG. 70
[58] Field of Search .............. 264/504, 556, 557, 154, 264/156, DIG. 70, 555, 572, 101, 210.1, 237, 348, 562, 571, 284, 210.2; 425/290, DIG. 37

[56] References Cited

U.S. PATENT DOCUMENTS

| 2,776,451 | 1/1957 | Chavannes | 264/555 |
|---|---|---|---|
| 3,054,148 | 9/1962 | Zimmerli | 264/504 |
| 3,141,817 | 7/1964 | Collins et al. | 162/372 |
| 3,374,303 | 3/1968 | Metz, Jr. | 264/556 |
| 3,700,763 | 10/1972 | Van Kralingen | 264/562 |
| 3,709,647 | 1/1973 | Barnhart | 264/555 |
| 4,151,240 | 4/1979 | Lucas et al. | 264/504 |
| 4,211,743 | 7/1980 | Nauta et al. | 264/284 |
| 4,252,516 | 2/1981 | Raley et al. | 425/290 |
| 4,259,286 | 3/1981 | Louis et al. | 264/555 |

FOREIGN PATENT DOCUMENTS

| 008382 | 5/1980 | European Pat. Off. . |
| 0059506 | 9/1982 | European Pat. Off. . |
| 2409496 | 4/1977 | Fed. Rep. of Germany . |
| 3016568 | 11/1980 | Fed. Rep. of Germany . |
| 2927719 | 9/1982 | Fed. Rep. of Germany . |

Primary Examiner—Jan H. Silbaugh
Assistant Examiner—Hubert C. Lorin
Attorney, Agent, or Firm—Cushman, Darby & Cushman

[57] ABSTRACT

A process is disclosed for the continuous manufacture of a perforated plastic film, where the plastic film is extruded directly from the extrusion unit either onto one roller of a pair of rollers or directly into the gap between a pair of rollers (a perforating/texturing roller and a back-up roller). The hot plastic film is perforated on a roller under the influence of a vacuum and shock cooling by the flow of cold air and the coolness of the back-up roller is carried out during the perforating step, and immediately thereafter. The film is preferably textured at the same time that it is perforated, the immediate cooling setting the texture in the film.

9 Claims, 2 Drawing Sheets

CONTINUOUS MANUFACTURE OF A PERFORATED PLASTIC FILM

BACKGROUND OF THE INVENTION

The invention relates to a process for the manufacture of a perforated and preferably textured soft plastic film which is perforated on a sievelike surface under the influence of a pneumatic vacuum in a thermoplastic state on leaving an extruder die.

A process of this kind is disclosed in the EU-A-0059506, where a plastic film is extruded onto a perforating roller and is then perforated with the help of a stream of hot air. The film is removed from this perforating roller via a cooling roller.

A further disclosure is to be found in DE-A-30 16 368, where an already produced film is fed over a perforated cylinder that is subjected to a pneumatic vacuum and hot air is blown at the film from the outside to perforate and emboss it. Before it leaves the cylinder, the film is also cooled with the help of air that is sucked through the film. This means it takes relatively long for film cooling to start with this process as well, which is extremely disadvantageous for the softness of the film.

DE-C-24 09 496 discloses the perforation of an already produced plastic film using a vacuum and hot air. The film is fed over a perforated cylinder inside which is a suction chamber and outside which—opposite the suction chamber—is a hot air nozzle. A particular disadvantage of this process is that the film first has to be heated up to the thermoplastic temperature range before it is perforated. It is especially difficult in this process to produce even film temperature over the whole of the film width.

SUMMARY OF THE INVENTION

The purpose of the present invention is to create a process by which a perforated and preferably textured plastic film can be produced which is also soft and flexible.

The way the present invention achieves this purpose is for the cooling of the film to begin at least approximately at the same time as the perforation and—if relevant—texturing operations. It is possible for the texturing to be carried out by a cooled back-up roller, which touches the sievelike surface along a line and the position of which makes it capable of controlling the pneumatic vacuum to which the opposite side of the sievelike surface is subjected.

Cold air is already sucked through the openings in the film by the pneumatic vacuum when the perforation operation is carried out, thus effectively reinforcing the shock cooling of the film brought about by the back-up roller. This very intensive shock cooling leads to rapid crystallization of the plastic, which in turn means that the film is soft, flexible and has a pleasant feel.

The process based on this invention is also particularly economic, as the film needs no heating.

Apart from this, adaptation to different film materials and conditions is no problem.

An advantageous embodiment of the invention is also that the film is extruded at least approximately into the gap between the sievelike surface and the back-up roller.

This practically simultaneous perforation and shock cooling of the film produce excellent conditions for perforating and texturing and in addition to this surprisingly result in excellent softness and flexibility.

It is also very advantageous if in accordance with this invention the back-up roller can be adjusted in relation to the area of the pneumatic vacuum on the sievelike surface. When this is the case, the gap in which the perforation is carried out can be set precisely and can be adjusted to produce the conditions required by the film parameters, such as film material, film thickness, temperature and speed.

This setting and adaptation is also possible if in accordance with the present invention the position of the area of the pneumatic vacuum can be adjusted in relation to the back-up roller.

It can also be very favourable if in accordance with a further embodiment of the invention the sievelike surface is patterned and the film is both perforated and textured on this surface. In such a case, the main purposes of the back-up roller are to control perforation pressure, the pressure applied for texturing purposes and temperature. It can, however, also have a texturing effect.

It is also very advantageous if in accordance with the present invention there is an area with pneumatic overpressure inside the sievelike surface in machine direction behind the pneumatic vacuum.

The primary aim of this pneumatic overpressure is to cool the film and can be used solely for this purpose. It also makes it easier to remove the film from the sievelike surface.

It is, however, also possible within the framework of the present invention that a water bath, through which the perforated film is fed for cooling purposes, is located outside the roller in the area of pneumatic overpressure. The pneumatic overpressure prevents water from penetrating at least the sievelike surface.

The pneumatic overpressure can, however, also be adjusted in such a way that penetration of water into the film perforations is prevented as well.

BRIEF DESCRIPTION OF THE INVENTION

The invention is described below on the basis of a number of embodiments shown in the drawings.

DETAILED DESCRIPTION OF THE INVENTION

Figure 1:
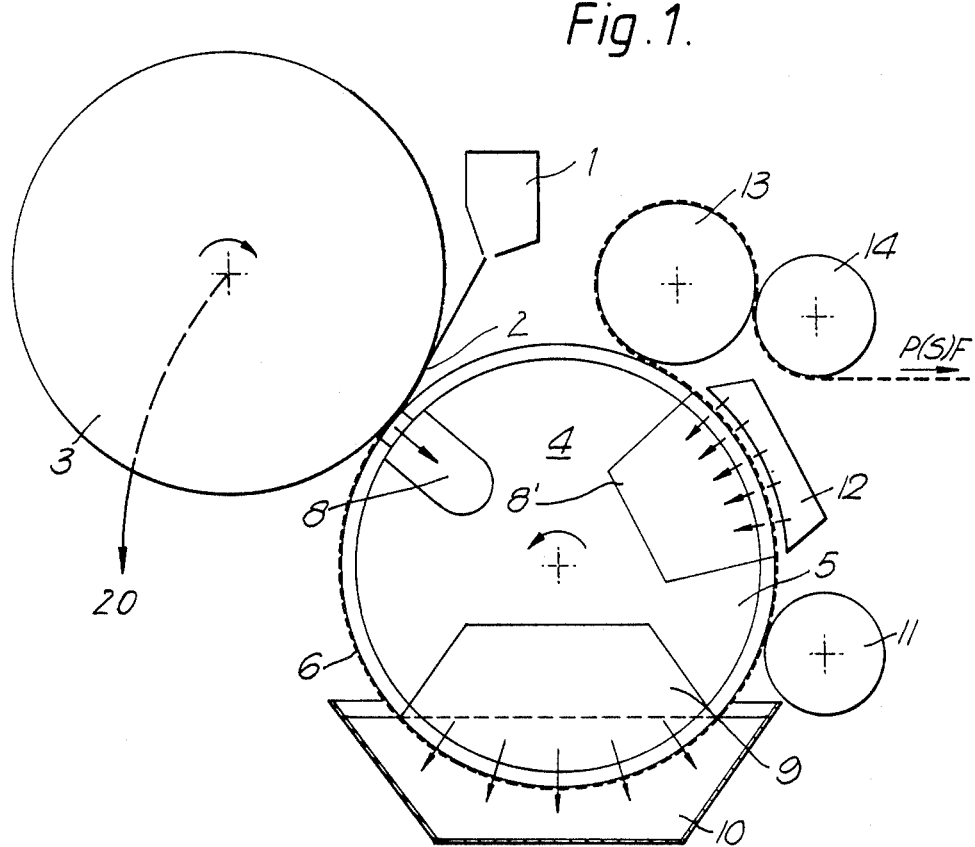
FIG. 1 shows a side view of a device with which a perforated and—if necessary—textured plastic film can be produced in accordance with the process based on this invention.

In FIG. 1 a plastic melt is extruded onto a back-up roller 3 from an extrusion unit 1, with the result that a plastic film 2 is formed. The plastics to be used for the process based on the present invention include polyolefins (homo- and copolymers), polyamides, polyester etc. Plastic film 2 is then fed onto perforating/texturing roller 4, which consists of a stator section 5 and a rotor section 6. Stator section 5 contains devices 8 whose purpose is to subject the plastic film to a pneumatic vacuum and a device 9 whose purpose is to subject the plastic film to pneumatic over-pressure. The open ends of devices 8 with their sealing elements 16 (see FIG. 2) rest against rotor section 6 consisting of sieve 6b and rotor elements 6a(see FIG. 2), which, for example, also contain sieve support elements 15. Devices 8 consist of vacuum chambers, which are connected to supply lines (not shown in the drawing) of a vacuum pump (not shown in the drawing). By this means a pneumatic vacuum 17 is applied (see FIG. 2).

Part of perforating/texturing roller 4 is immersed in a water bath 10 and device 9 is located inside the perforating/texturing roller diametrically opposite this water bath. Application of the pneumatic overpressure stops water penetrating the sieve. A doctor roller 11 is located after the water bath 10. Additional cooling is carried out by a blowing unit 12 with the assistance of a suction device 8' located diametrically opposite.

The perforated and-if necessary-textured plastic film (P(S)F) is removed from perforating/texturing roller 4 via an S-take-off unit, consisting of a take-off roller(-guide roller) 13 and a rubber-coated roller 14.

Figure 2:
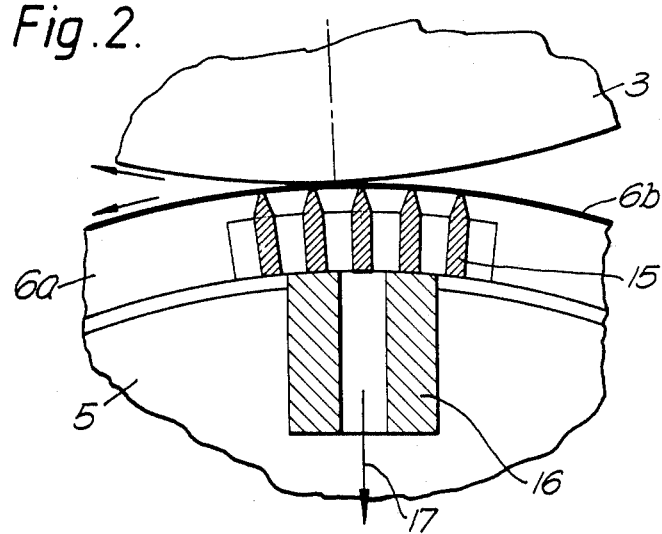
FIG. 2 shows a diagram of part of the perforating-/texturing roller and the back-up roller in the area of the perforation suction channels of the former and the point of contact between both the rollers.

FIGS. 1 and 2 give a clear picture of how the effect of the vacuum 17 is controlled by the presence of back-up roller 3. An arrow (20) shows how back-up roller 3 can be adjusted to the position shown in FIG. 3. Device 8, which is used to carry out perforation, is also adjusted to this position, so that the effect of the vacuum is controlled by the back-up roller in this position as well the roller 3 touching the sievelike surface 6b and controlling the flow of cold air through the perforations formed in the film 2 by the sievelike surface 6b and vacuum 17.

Figure 3:
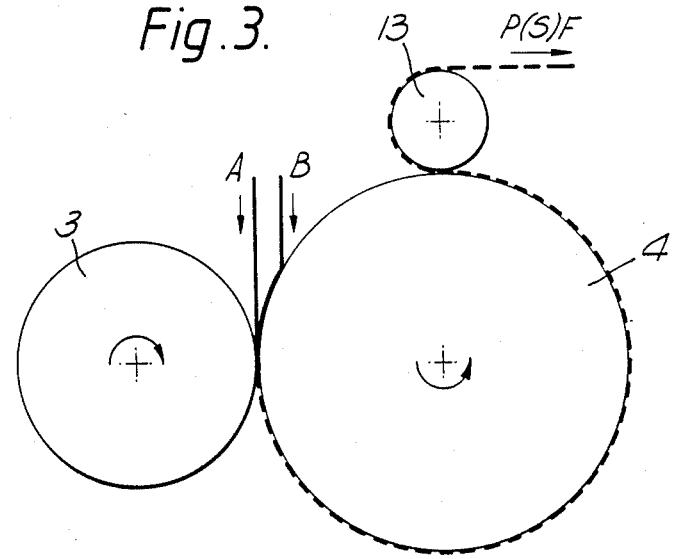
FIG. 3 shows a different embodiment of the process based on this invention.

FIG. 3 is a diagram of a different embodiment of the process based on the present invention. The melt from the extrusion unit can be extruded either directly into the gap between back-up roller 3 and perforating/texturing roller 4 (as indicated by arrow A) or onto perforating/texturing roller 4 (as indicated by arrow B), although this is directly before the gap in this case too.

Figure 4:
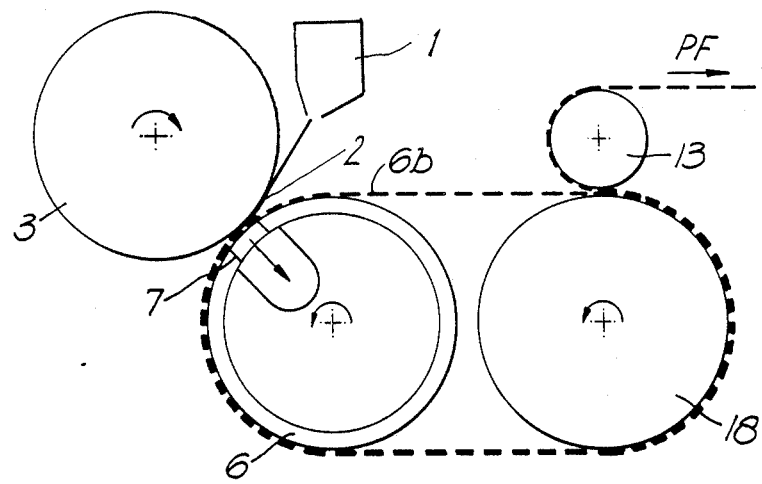
FIG. 4 shows a further embodiment of the process based on this invention, where cooling is carried out by means of a cooling roller located next to the perforating/texturing roller.

FIG. 4 shows an embodiment of the process based on this invention where cooling is carried out by means of a cooling roller 18 located next to the perforating /texturing roller 24. In this embodiment the gas-permeable surface consists of the cylindrical wall of rotor section 26 and an endless sieve 26b which runs around both rollers. In the embodiment shown here, the plastic film is only perforated (PF).

In a device as shown in FIG. 1, low-density polyethylene (density 0.92 g/cm$^3$; melt index at 190° C./2,16) was extruded directly from the extrusion unit onto the back-up roller directly before the gap formed by the two rollers at a temperature of 250° C. The polyethylene film produced was perforated at 120°–180° C. and then cooled in a water bath (15° C.) with the assistance of a blowing unit. The perforated film taken off from the perforating roller had a temperature of 60° C. and was 25–30 microns thick.

We claim:

1. A method for manufacturing a perforated plastic film utilizing a perforating roller having a sievelike peripheral surface and an interior vacuum source, comprising the steps of:
   (a) passing a film in a thermoplastic state from an extruder to the sievelike surface of the perforating roller;
   (b) effecting a perforating action on the film with the perforating roller by the air being sucked through the sievelike surface into the interior vacuum source; and
   (c) effecting shock cooling of the film substantially simultaneously with the perforating action thereof by sucking cold air through the thermoplastic film during the practice of step (b), and by bringing the film into contact with a cooled back-up roller, the back-up roller being contacted simultaneously with the practice of steps (a) and (b).

2. A method as recited in claim 1 comprising a further step (d) of texturing the film simultaneously with the practice of step (b).

3. A method as recited in claim 2 wherein step (d) is practiced by contacting the film with the back-up roller while the film is supported by the sievelike surface.

4. A method as recited in claim 3 comprising a further step (e) of immediately effecting further cooling of the film after the practice of step (d) to set the texturing in the film.

5. A method as recited in claim 4 wherein step (e) is practiced by immersing the film in a cool liquid bath while the film is still in contact with the sievelike surface, and while simultaneously providing a pneumatic pressure within the perforating roller at the liquid bath so that liquid from the bath does not pass through the perforations in the film into the interior of the perforating roller.

6. A method as recited in claim 5 wherein step (e) is further practiced by blowing cool air on the film while still in contact with the sievelike surface, and after passage thereof through the liquid bath, and simultaneously applying a vacuum to the film from the interior of the perforated roller at the area of the film where cool air is being blown upon the film.

7. A method as recited in claim 1 wherein the sievelike peripheral surface of the perforating roller is provided by an endless sieve which is in contact with the periphery of the perforating roller and the periphery of a cooling roller located adjacent the perforating roller, and rotatable about an axis of rotation parallel to the axis of rotation of the perforating roller; and comprising a further step of effecting further cooling of the film after step (c) by passing the film still in contact with the endless sieve into operative association with the cooling roller.

8. A method as recited in claim 1 wherein the perforating roller and back-up roller are rotatable about parallel axes of rotation; and comprising a further step of adjusting the axis of rotation of the back-up roller with respect to the interior vacuum source of the perforating roller so as to control the vacuum to which the thermoplastic film is subjected during the practice of step (b).

9. A method as recited in claim 8 wherein step (a) is practiced by passing the film approximately into a gap between the sievelike surface of the perforating roller and the back-up roller.

* * * * *